US005311166A

United States Patent [19]

Frye

[11] Patent Number: 5,311,166

[45] Date of Patent: May 10, 1994

[54] SECURITY VESTIBULE

[76] Inventor: Filmore O. Frye, 42 W. Blaine St., McAdoo, Pa. 18237

[21] Appl. No.: 934,333

[22] Filed: Aug. 18, 1992

[51] Int. Cl.[5] ........................ C08B 13/18; C08B 15/00

[52] U.S. Cl. ........................................ 340/541; 109/6; 109/20; 109/21; 340/552; 340/554; 340/691; 340/692

[58] Field of Search ............... 340/691, 692, 541, 552, 340/554, 545; 109/20, 21, 6, 29, 31, 35, 38

[56] References Cited

U.S. PATENT DOCUMENTS

| | | | |
|---|---|---|---|
| 1,923,979 | 8/1933 | Howett | 222/212 |
| 2,072,941 | 3/1937 | Burch, Jr. et al. | 102/367 |
| 2,909,767 | 10/1959 | Zaltman | 109/31 |
| 3,566,146 | 2/1971 | Breeze, III et al. | 109/35 |
| 3,732,555 | 5/1973 | Strenglein | 340/522 |
| 3,915,103 | 10/1975 | Rupert et al. | 109/20 |
| 4,328,487 | 5/1982 | Cheal | 340/554 |
| 4,586,441 | 5/1986 | Zekich | 109/6 |
| 4,821,027 | 4/1989 | Mallory et al. | 340/521 |
| 4,835,520 | 5/1989 | Aiello | 340/545 |
| 4,841,752 | 6/1989 | Fletcher | 109/20 |
| 4,876,076 | 9/1989 | Marcone | 109/20 |
| 4,928,429 | 5/1990 | Colombo | 49/41 |
| 4,996,521 | 2/1991 | Hollow | 340/541 |
| 5,117,217 | 5/1992 | Nykerk | 340/692 |
| 5,195,448 | 3/1993 | Sims | 109/6 |

*Primary Examiner*—Glen R. Swann, III

*Attorney, Agent, or Firm*—Richard C. Litman

[57] ABSTRACT

A security system for a vestibule and, more specifically, a security vestibule is equipped with monitoring devices to monitor the presence of an intruder. The monitoring devices transmit signals to warning devices, such as a speaker which broadcasts an audible message as well as a siren and a flashing light which produce audible and visual signals, respectively, to attract attention exteriorly of the vestibule. The monitoring devices further transmit signals to deterrent devices which disturb or offend the perpetrator. The devices are of the type which disperse foul scents, dispense dyes to mark the perpetrator, disperse water at varying temperatures, and discharge electrical shock.

14 Claims, 4 Drawing Sheets

SECURITY VESTIBULE

BACKGROUND OF THE INVENTION

1. Field of the Invention

The present invention relates to a security system for a vestibule and, more specifically, to a security vestibule fitted with deterrents which may provide variable environmental conditions to discourage entry therethrough.

2. Description of the Prior Art

Crime is a sad reality in the world. No matter where one lives, whether in a large urban area or a rural locale, an unlocked door or an open window is an invitation that, far too often, will be accepted. Oftentimes, merely the absence of the inhabitant is enough to encourage a criminal or group of criminals to enter and pilfer or vandalize the premises. Locks are often not enough as they can be picked or merely broken through. The overworked and strained police forces cannot, through no fault of their own, prevent all crimes from occurring. A device which could monitor activity proximate the exterior of a structure and fend off aggressors could assist in protecting the interior of the structure as well as the contents therein.

U.S. Pat. No. 1,923,979 issued Aug. 22, 1933 to Charles E. Howett discloses a liquid projecting device for projecting an irritant gas or liquid into the face of a perpetrator. The device is constructed such that it may be concealed in an ordinary bundle of paper currency without drawing attention. The device is operated by applying pressure to the bundle.

U.S. Pat. No. 2,072,941 issued Mar. 9, 1937 to Alfred E. Burch, Jr. et al. describes a theft prevention system which produces an irritant gas. A fusible electrical element is actuated by a foot operated switch to release the irritant gas. The gas may be projected from a nozzle in a predetermined direction or may be scattered from a bomb.

U.S. Pat. No. 4,821,027 issued Apr. 11, 1989 to John Mallory et al. describes a voice interactive security system for monitoring and detecting security breaches in a home. The system comprises a central monitor and a plurality of remote sensors. A microprocessor system actuates a speech synthesizer to produce predetermined messages in response to input from a keyboard and in accordance with a programmable scheme based on recorded electronic messages from a transmitter.

U.S. Pat. No. 4,835,520 issued May 30, 1989 to Thomas Aiello discloses a message generating apparatus for discouraging access to a compartment during designated time intervals and, more particularly, to a refrigerator alarm which generates voice-like audible messages whenever the refrigerator door is opened within a designated alarm time interval. The opening of the refrigerator door can be detected from either a motion detector or a door switch.

U.S. Pat. No. 4,841,752 issued Jun. 27, 1989 to Richard N. Fletcher describes a theft deterrent apparatus comprising a plurality of nozzles positioned within an elongated deflecting shield. The nozzles may be manually and selectively activated by a foot pedal or a secondary switch. The nozzles may dispense disabling chemical fluid upon activation of a control valve by the foot pedal and secondary switch. Optionally, the nozzles may be oriented overhead.

U.S. Pat. No. 4,867,076 issued Sep. 19, 1989 to Louis J. Marcone discloses a theft deterrent system for dispensing a liquid chemical scent in a spray form on a target perpetrator. The liquid chemical scent is discharged from a pressurized discharge container. The discharge is controlled by a solenoid valve which is actuated manually or selectively.

U.S. Pat. No. 4,928,429 issued May 29, 1990 to Attilio Colombo discloses a security vestibule for controlling access. Two walls of the vestibule have substantially circular arcuate bases, different diameters, and respective angular breadths whose sum is at least 360 degrees, being mounted on respective concentric circular tracks and forming vestibule doors.

None of the above inventions and patents, taken either singly or in combination, is seen to describe the instant invention as claimed.

SUMMARY OF THE INVENTION

The present invention relates to a security system for a vestibule and, more particularly, to a security vestibule. The vestibule has an inner and outer door and two side walls. An interior is bound by the interior door, the exterior door, and the side walls. The security system includes a sensor oriented such that the presence of a perpetrator proximate the vestibule is detectable by the sensor to produce a response signal. The security system is also provided with an audible device that produces a sound in response to a signal produced by the sensor. Moreover, the security system has a deterrent device which produces a change in the environmental conditions proximate the vestibule. The deterrent device is also responsive to the signal being produced by the sensor. If the presence of the perpetrator is detected by the sensor, the sensor produces the response signal which is received by the audible device which, in turn, produces a sound to warn the perpetrator. If the presence of the perpetrator continues, the response signal is shunted to the deterrent device which produces a change in the environmental condition proximate the vestibule, thus further deterring the presence of the perpetrator.

Accordingly, it is a principal object of the invention to provide a security system for a vestibule and, more particularly, to provide a security vestibule.

It is another object of the invention to provide a security vestibule having an interior door, an exterior door, two side walls, and an interior bound by the interior door, the exterior door, and the two side walls.

Still another object of the invention is to provide a security system for the security vestibule including a sensor oriented such that a presence of a perpetrator proximate the vestibule is detectable by the sensor to produce a response signal.

It is yet another object of the invention to provide a security system for the security vestibule also having an audible device that produces a sound in response to the signal produced by the sensor.

An object of the invention is to provide a security system for a security vestibule including a deterrent device which produces a change in an environmental condition proximate the vestibule responsive to a response signal being produced by said sensor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
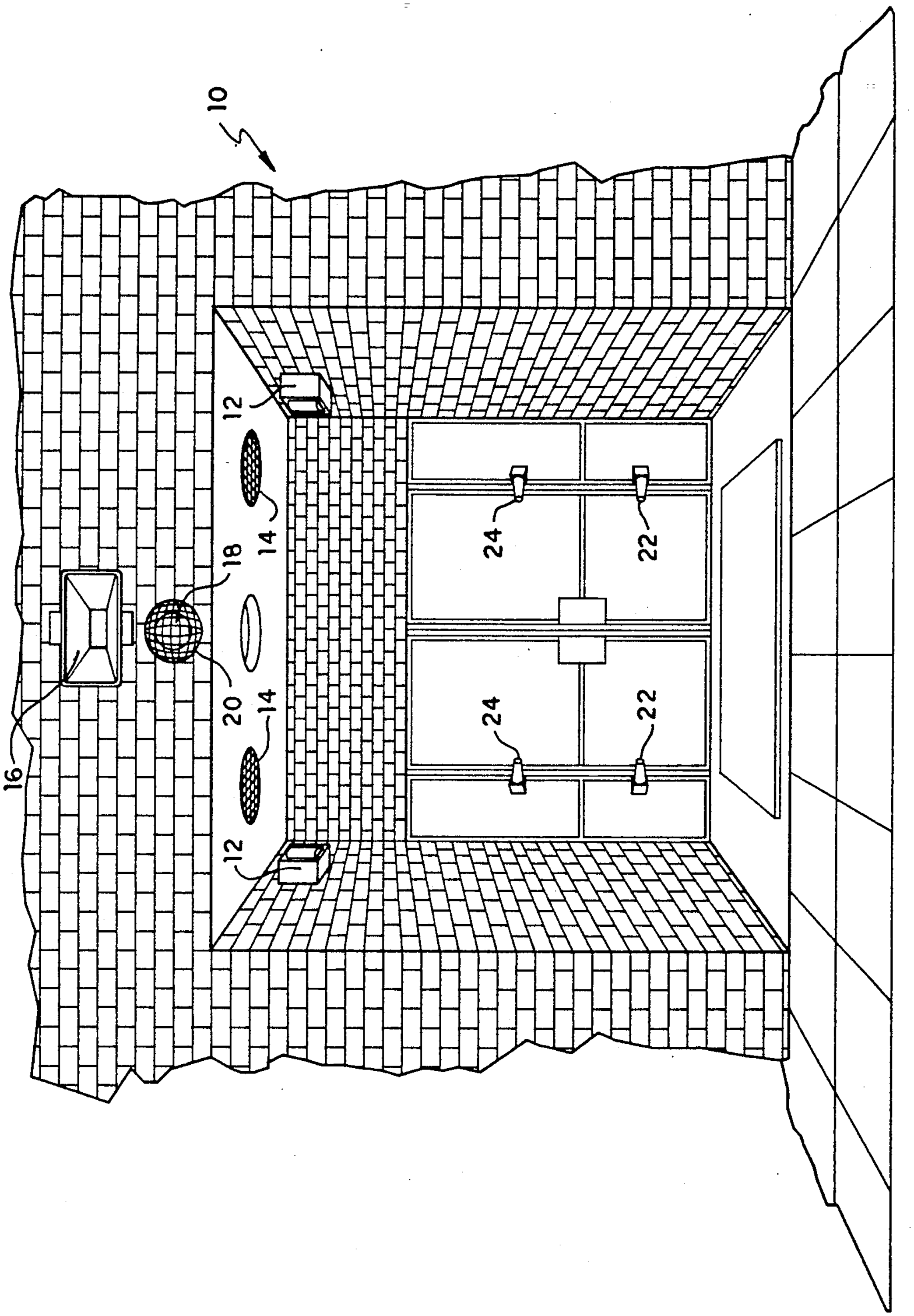
FIG. 1 is an environmental perspective view of the security vestibule.

The present invention is a security vestibule 10. The security vestibule 10 is armed with interior deterrents and exterior deterrents. FIG. 1, in particular, shows the exterior deterrents comprising a first set of motion detectors 12 or sensors which sense the presence of an intruder (not shown). The speakers 14 produce a verbal warning as a first attempt to warn intruders off. The speakers 14 are oriented to ensure that a clear audible warning is broadcast. If the vestibule 10 continues to be violated, a siren 16 begins to transmit a loud signal and a light 18 begins to flash. The siren 16 and the light 18 are positioned so as to attract attention from the exterior of the vestibule 10. The light 18 may be shielded with a wire cage 20 to protect the same from vandals. If the breach of the vestibule 10 persists, a first pair of nozzles 22 will release a foul scent. As a final measure of protection, a second pair of nozzles 24 disperses a dye to mark the perpetrator, thus permitting the intruder to be spotted remotely from the premises.

Figure 2:
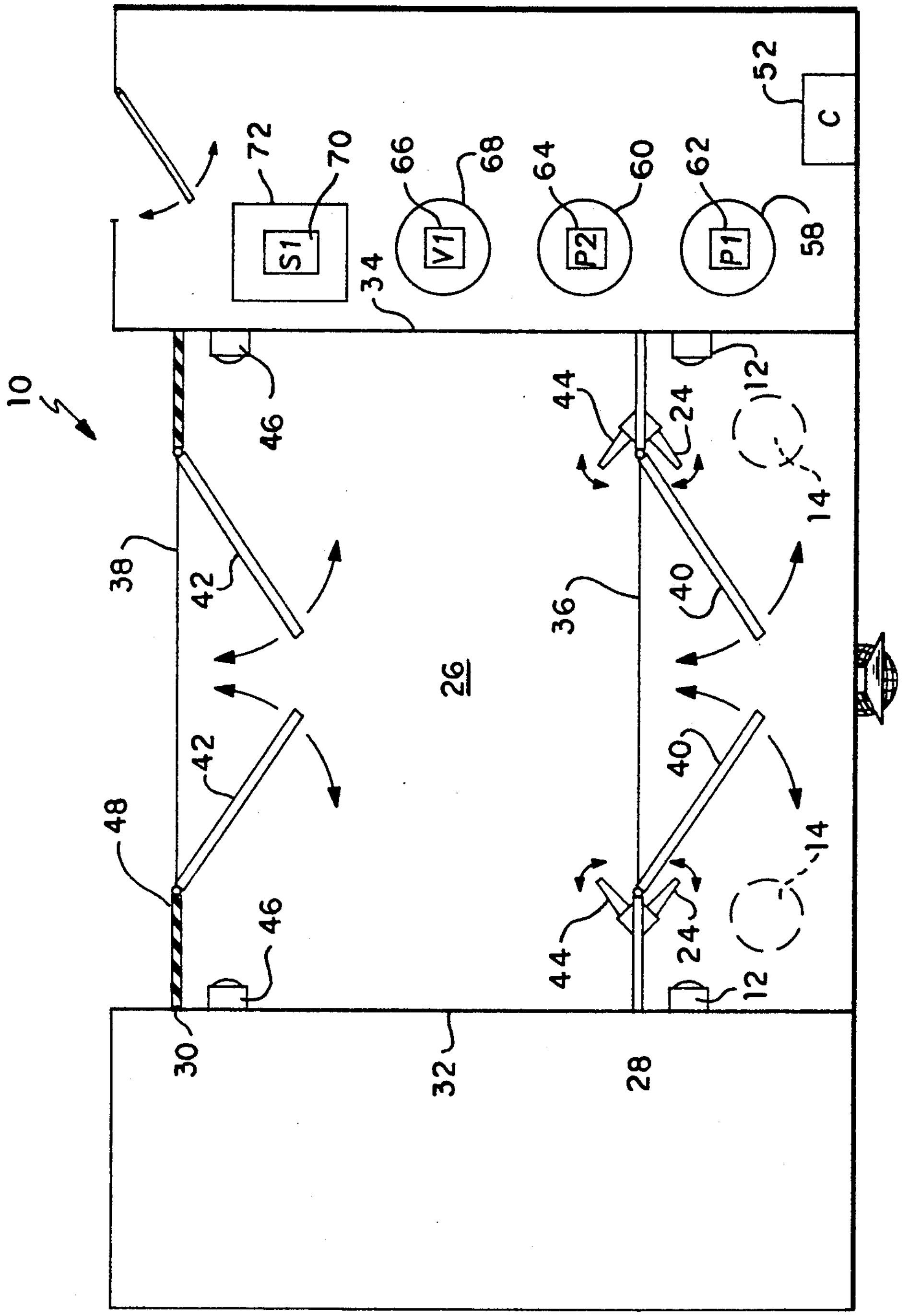
FIG. 2 is a top plan view of the security vestibule and supporting component parts therefor.
Figure 3:
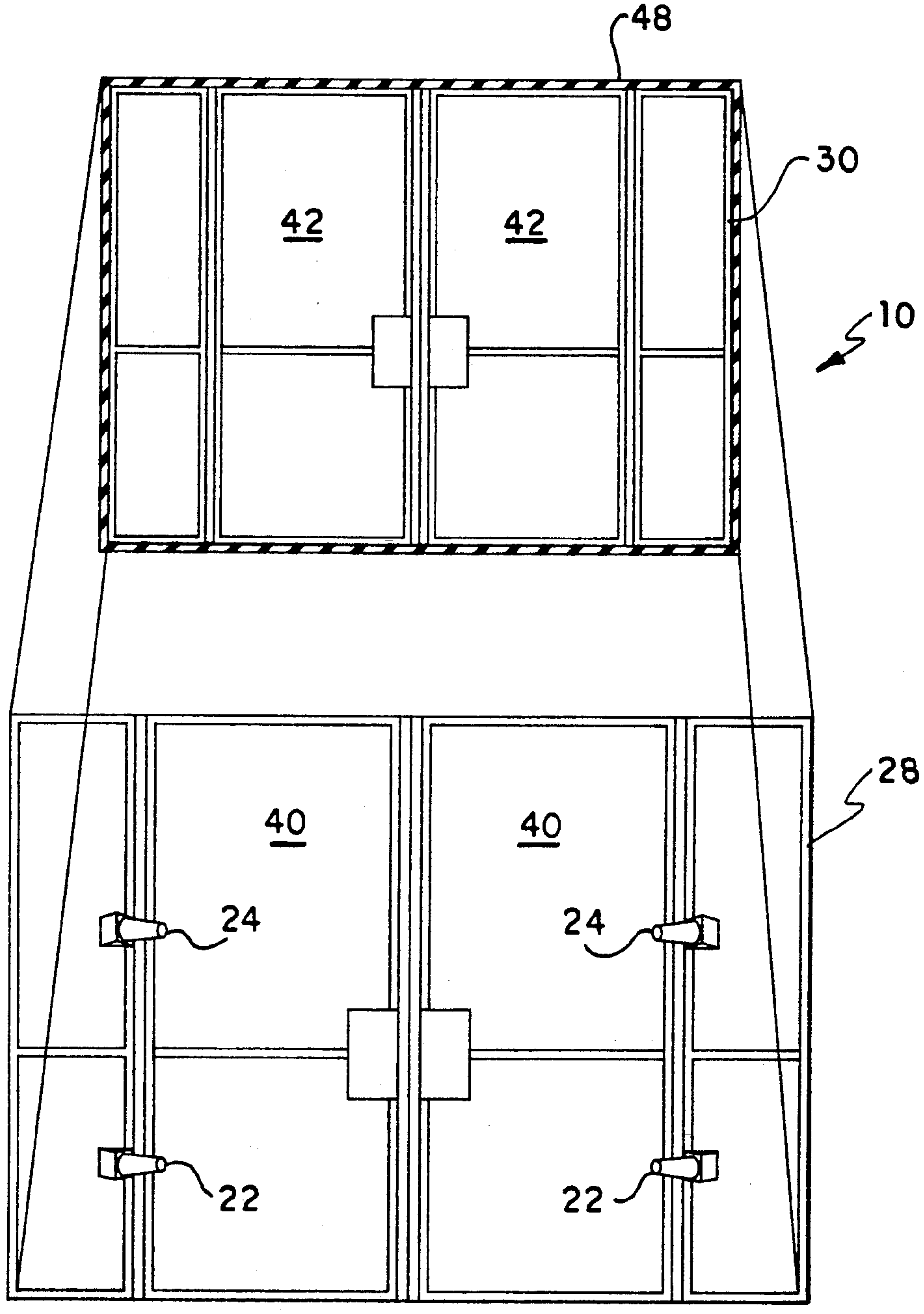
FIG. 3 is a front perspective view of the security vestibule.

FIGS. 2 and 3 show the vestibule 10 having an interior 26 bound by four peripheral walls. The four peripheral walls include an exterior wall 28, an interior wall 30, and first and second side walls 32,34. The exterior and interior walls 28,30 are disposed parallel relative to one another as are the two side walls 32,34. The exterior and interior walls 28,30 are connected at right angles to the two sides walls 32,34 to form a rectangular periphery about the interior 26.

The exterior and interior walls 28,30 each include a passageway 36,38 and a respective set of doors 40,42. The nozzles 22,24 are arranged on an outer surface of the exterior wall 28 adjacent to the doors 40. On the inner surface of the exterior wall 28 adjacent to the doors 40, are nozzles 44 for dispensing water. The water temperature may be adjusted, such as from cold to scalding. The nozzles 44 dispense water in response to signals produced by a second set of motion detectors 46. Other sensors, such as door switches, may be employed in the place of the motion detectors 12,46. The signal produced by the motion detectors 46 further electrify both the interior wall 30 and the interior doors 42. The is accomplished with a DC source 72. The voltage of the DC source may be adjusted to provide a mild to near lethal charge. As shown in FIG. 3, the interior wall 30 and the doors 42 associated therewith are insulated from ground so as to increase the ability of the electric field to deter intruders. The insulation 48 may of any nonconductive material. The insulation 48 increases the likelihood the maximum potential will be received by the perpetrator.

Figure 4:
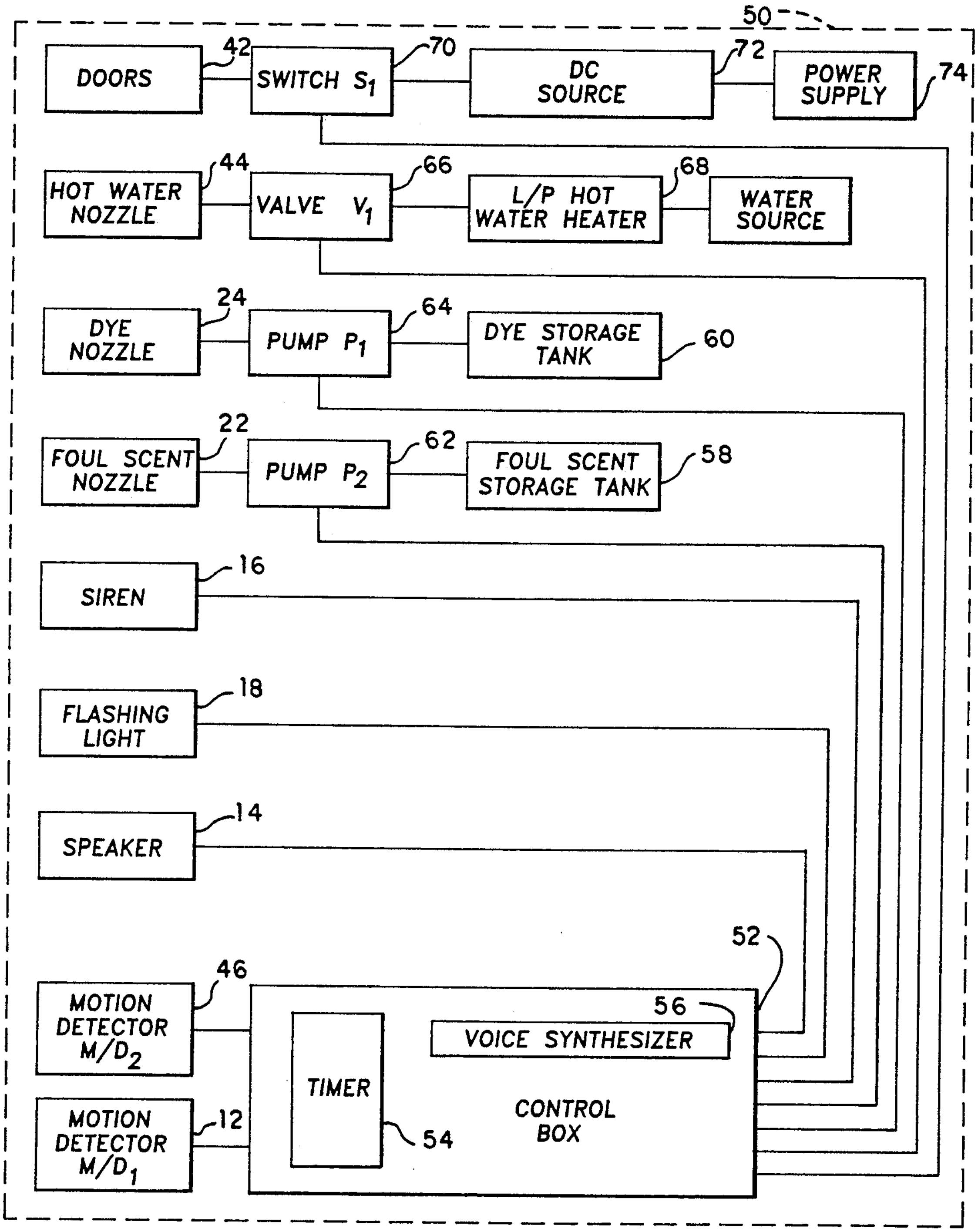
FIG. 4 is a block diagram of the security vestibule.

Now referring to FIGS. 2 and 4, a block diagram of the security system 50 for use with the security vestibule 10 is shown. The system 50 preferably operates on a low voltage independent power source. Prior to entry of the vestibule 10, an intruder would be detected by the first set of motion detectors 12. A signal would be transmitted to a control box 52. A timer 54 would measure the length of time in which the intruder is present. At a predetermined time lapse or interval, a verbal message would be broadcast through a speaker 14. The verbal message could be produced by a voice synthesizer 56 as is shown in the drawing. If the presence of a perpetrator continues to be detected, the siren 16 begins to broadcast a signal and the light 18 begins to flash. Next, the intruder is subjected to the foul scent and dye being dispersed from respective tanks 58,60 through the nozzles 22,24. This is accomplished through a series of signals originating from the control box 52 being transmitted to the respective pumps 62,64. One signal actuates the first pump 62 to disperse the foul scent through the respective nozzles 22. A second signal actuates the second pump 64 to dispense the dye through the respective nozzles 24. If the intruder enters into the vestibule 10, a signal is transmitted from the control box 52 to energize or open a valve 66, thus permitting the passage of water to flow from a hot water heater 68 through the nozzles 44. The hot water heater 68 is preferably an L/P hot water heater to ensure constant delivery of hot water at all times. Alternatively, a refrigeration unit could replace the water heater 68 to provide cold water to the nozzles 44. Simultaneously, a switch 70 receives a signal from the control box 52. The switch 70 is closed to permit the flow of current to the interior wall 30 and the doors 42 associated therewith. The current is supplied from a high voltage DC source 72. The DC source 72 is preferably powered by an uninterruptible power supply 74 to ensure that the DC source 72 may supply current on demand.

It is to be understood that the present invention is not limited to the sole embodiment described above, but encompasses any and all embodiments within the scope of the following claims.

I claim:

1. A security system for a vestibule providing sequentially increasing deterrence to the unauthorized entry thereof and encouraging the exit thereof, the vestibule having an interior door, an exterior door, two side walls, and an interior defined by the interior door, the exterior door, and the side walls, said security system comprising:

first sensing means disposed externally relative to the exterior door and providing for the detection of a person approaching the exterior door;

at least one primary deterrent means disposed externally relative to the exterior door and providing a change in an environmental condition proximate the exterior door and deterring the presence of a person thereby;

second sensing means disposed within the interior of the vestibule and providing for the detection of a person within the interior of the vestibule;

at least one final deterrent means disposed within the interior of the vestibule and providing a change in an environmental condition within the interior of the vestibule and encouraging the departure of a person therefrom through the exterior door; and control means communicating with said first sensing means, said at least one primary deterrent means, said second sensing means, and said at least one final deterrent means and providing for the sequential operation of said first sensing means, said at least one primary deterrent means, said second sensing means, and said at least one final deterrent means in that order, whereby;

actuation of said first sensing means by the presence of a person outside of the vestibule causes said control means to activate said at least one primary deterrent means, and actuation of said second sensing means by the presence of a person within the vestibule causes said control means to activate said at least one final deterrent means.

2. The security system according to claim 1, wherein said first sensing means and said second sensing means are each motion detection devices.

3. The security system according to claim 1, wherein said first sensing means is a door switch which detects the movement of the exterior door from a closed position to an open position.

4. The security system according to claim 1, wherein said at least one primary deterrent means includes a speaker capable of producing a verbal warning message to fend off the perpetrator.

5. The security system according to claim 1, wherein said at least one primary deterrent means includes a siren capable of broadcasting exteriorly of the vestibule to attract attention exteriorly of the vestibule.

6. The security system according to claim 1, wherein said at least one primary deterrent means includes a light responsive to said actuation of said first sensing means, said light being produced exteriorly of the vestibule to attract attention exteriorly of the vestibule.

7. The security system according to claim 6, wherein said light is a flashing light.

8. The security system according to claim 6, wherein said light includes a wire cage thereover for the protection thereof against damage.

9. The security system according to claim 1, wherein said at least one primary deterrent means includes audible warning means and a sequentially activated means to dispense a foul scent and said change in the environmental condition proximate the exterior door is defined as an audible warning alerting the person to the subsequent activation of a dispersion of said foul scent, whereby said foul scent is offensive to the person's sense of smell.

10. The security system according to claim 1, wherein said at least one primary deterrent means includes audible warning means and a sequentially activated means to discharge a dye and said change in the environmental condition proximate the exterior door is defined as an audible warning alerting the person to the subsequent activation of said discharge of said dye, whereby said dye marks the person, offending the person's tactile senses and enabling the person to be identified remotely from the vestibule.

11. The security system according to claim 1, wherein said at least one final deterrent means includes a means to dispense water, said water being dispersable at varying temperatures, and said change in the environmental condition within the vestibule is defined as a dispersion of said water, whereby said dispersion of said water is offensive to the person's tactile senses.

12. The security system according to claim 1, wherein said at least one final deterrent means includes a means to induce voltage upon the interior door, said voltage being inducible at varying levels, and said change in the environmental condition within the vestibule is defined as an induced voltage upon the interior door, whereby when the person engages in contact with the interior door, a current is discharged through the person, thus offending the person's tactile senses.

13. The security system according to claim 12, wherein the interior door is insulated from ground by an insulation material to ensure that the person receives a maximum effect of said current being discharged.

14. The security system according to claim 1, wherein said control means includes timer means, whereby said first sensing means activates said timer means, said timer means begins to measure a time interval from said timer means activation, and after at least one predetermined time interval, said control means activates said at least one primary deterrent means, thus delaying an actuation of said at least one primary deterrent means, thereby decreasing a risk of inadvertent actuation of said at least one primary deterrent means.

* * * * *

UNITED STATES PATENT AND TRADEMARK OFFICE

CERTIFICATE OF CORRECTION

PATENT NO. : 5,311,166

DATED : May 10, 1994

INVENTOR(S) : Filmore O. Frye

It is certified that error appears in the above-indentified patent and that said Letters Patent is hereby corrected as shown below:

On title page, change application number from "934,333" to --931,333--.

Signed and Sealed this

Second Day of August, 1994

Attest:

Bruce Lehman

BRUCE LEHMAN

*Attesting Officer*

*Commissioner of Patents and Trademarks*